May 6, 1958 A. M. LEVINE 2,833,960
POWER SUPPLY SYSTEM
Filed Oct. 7, 1954
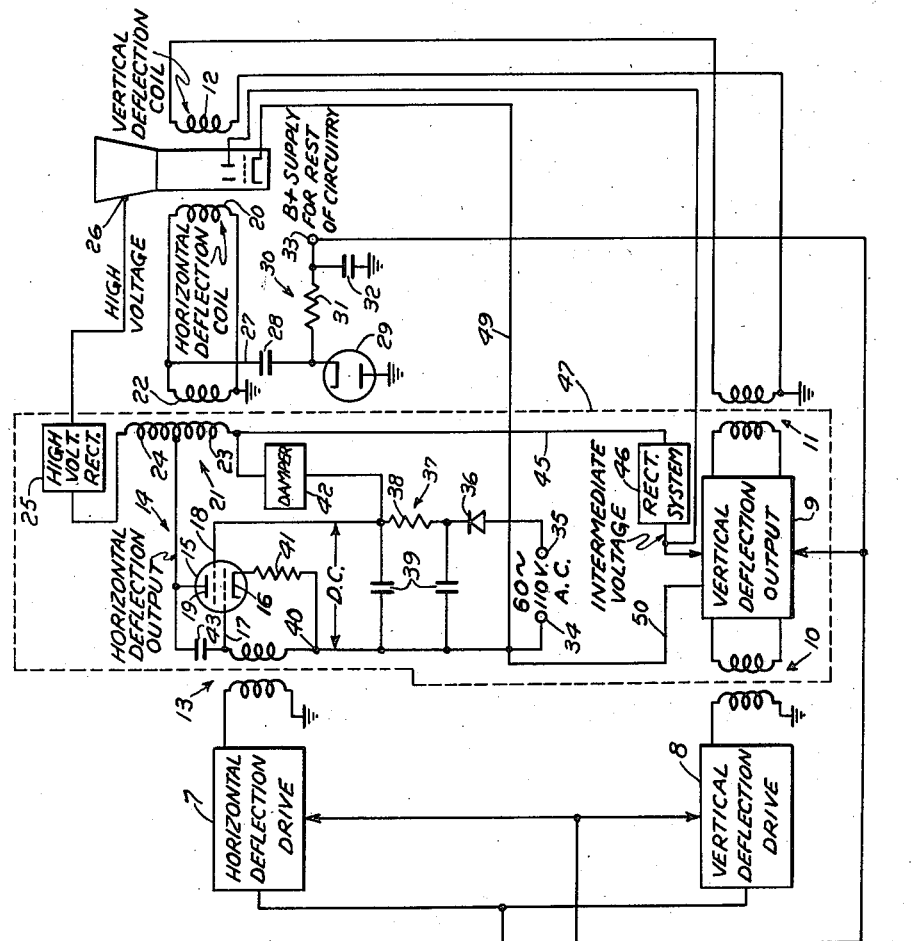
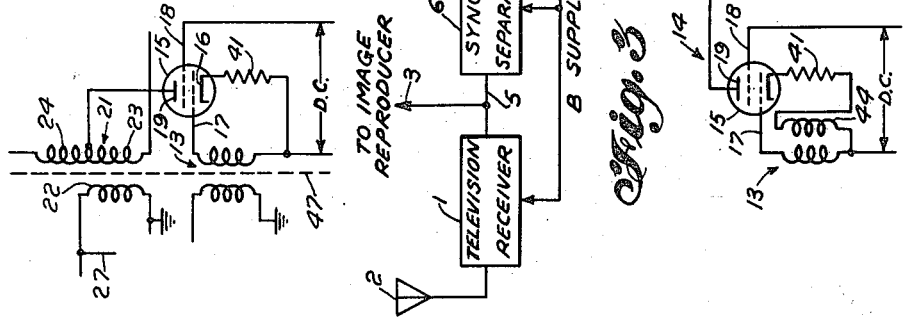
INVENTOR
ARNOLD M. LEVINE
BY
ATTORNEY

United States Patent Office 2,833,960
Patented May 6, 1958

2,833,960

POWER SUPPLY SYSTEM

Arnold M. Levine, River Edge, N. J., assignor to International Telephone and Telegraph Corporation, Nutley, N. J., a corporation of Maryland Application October 7, 1954, Serial No. 460,887

19 Claims. (Cl. 315—27)

This invention relates to power supply systems for electronic equipment and more particularly to power supply systems of the pulse step-up type for the generation of both a high unidirectional voltage and a low unidirectional voltage required for the operation of a television receiver or the like. This is a continuation in part of my copending application, Serial No. 367,291, filed July 10, 1953.

In the art to which this invention pertains, numerous pulse step-up type power supply systems have been proposed for the generation of relatively high unidirectional voltage suitable as an accelerating potential for cathode ray equipment as used in a television system, although not necessarily limited thereto, and is of particular value in television receivers wherein the high voltage for the image reproducer is to be derived from energy extracted from the image reproducer deflection circuits. The equipment employing such a pulse step-up type power supply usually incorporates as an integral part thereof a second power supply system for development of the usual B+ or low unidirectional voltage necessary for operation of various portions of the equipment, such as the anode potential for electron discharge circuitry.

A space saving and a cost reduction may be realized in the production of power supply system incorporated in equipment to which the art of this invention pertains, if the high unidirectional potential and the low unidirectional potential could be developed from the same power supply system rather than from the usually employed independent power supply systems.

To realize the space saving and cost reduction it is necessary to decide upon an arrangement for developing the low potentials which will not necessitate expensive components, will not require a large amount of space, and will not present a shock hazard to service personnel or those persons operating the equipment. Low voltage power supply arrangements heretofore employed as a single entity may be classified in two categories. The first category comprises an arrangement which includes an iron core power transformer to step-up the 110 volt A. C., 60 cycle, line voltage to a desired value, a rectifying circuit in the secondary thereof to remove the A. C. component from this stepped-up voltage, and a voltage divider arrangement to distribute the desired values of unidirectional potentials to various components of the equipment. In this arrangement the chassis, serving to physically support the components of the power supply and electrically as the ground point bus bar, is isolated from the power line voltage by means of the iron core transformer employed for stepping-up the line voltage. The second category includes an arrangement to eliminate the expensive and bulky iron core transformer and is popularly referred to as an A. C.–D. C. type power supply which includes an arrangement of rectifier devices and filter networks to both step-up the line voltage to the desired value and smooth out the alternating components thereof. This type of relatively inexpensive power supply systems, however, has the disadvantage of placing the chassis at the same potential as the line voltage under certain conditions, and therefore, presents a shock hazard to those persons operating or repairing the equipment.

A power supply system of commercial value for employment in electronic equipment of the type described should provide a cost and space reduction with freedom from shock hazards. The cost and space reduction rather obviously may be accomplished by eliminating the iron core power transformer of the popularly known A. C. type power supply by employing an A. C.–D. C. type power supply arrangement. The elimination of the shock hazard in an A. C.–D. C. type of power supply, however, is not as obvious and is included as a feature of this invention.

Therefore, it is an object of this invention to provide a relatively compact and inexpensive power supply system capable of developing both a high unidirectional potential and a low unidirectional potential with freedom from shock hazards.

Another object of this invention is to provide a pulse step-up type power supply for employment in electronic equipment having cathode ray equipment for developing in the same power supply system both a high unidirectional potential and a low unidirectional potential from the energy extracted from the deflection system of said cathode ray equipment.

A further object of this invention is to provide a novel power supply system for developing both a high unidirectional potential and a low unidirectional potential for a television receiver and for isolating the chassis thereof from the power line voltage wherein the energy to produce both said high and low potentials are serially extracted from an input circuit of an electrical utilization means.

A feature of this invention is the provision of a power supply system comprising in combination a means for developing a high unidirectional potential by extracting the energy available upon the collapse of the magnetic flux in an electromagnetic deflection system of a cathode ray device and a means for developing a low unidirectional voltage from the deflection system during the same period of collapsing magnetic flux.

Another feature of this invention is the provision of a rectifier and filter arrangement in association with the horizontal deflection output electron discharge device for production of an appropriate D. C. potential from the power line voltage for establishing the operation characteristics of said horizontal deflection output device to enable the delivery of a sawtooth shaped sweep voltage with a rapid retrace portion for activation of the deflection system of a cathode ray device.

A further feature of this invention is the provision of a means to isolate the chassis of electronic equipment utilizing my power supply system from the power line voltage including the air core or powdered iron high frequency coupling transformers normally disposed in the horizontal and vertical deflection systems of electronic equipment, such as a television receiver or the like.

The above-mentioned and other features and objects of this invention will become more apparent by reference to the following description taken in conjunction with the accompanying drawing, wherein:

Fig. 1 illustrates a circuit diagram, partially in schematic, of an embodiment of the present invention as applied to a typical television receiving circuit;

Fig. 2 illustrates an alternate circuit arrangement for the horizontal deflection output circuit of Fig. 1; and Fig. 3 illustrates a second alternate circuit arrangement for the horizontal deflection output circuit of Fig. 1.

Referring to Fig. 1 there is shown in block 1 a television receiver including therein an R.-F. amplifier, an oscillator, mixer, intermediate frequency amplifier, video demodulator and video amplifier which will be recognizable to those skilled in the communication art as being exemplary components of one form of television system. The television signal is intercepted by antenna 2 and after being translated through the television receiver 1, produces a video signal at terminal 3 suitable for application to an image reproducing device, such as diagrammatically illustrated by image reproducer 4. The composite video signal appearing at terminal 3 is conventionally applied through conductor 5 to a sync separator circuit 6 which extracts from the composite video signal horizontal synchronizing information and vertical synchronizing information which are respectively applied to the horizontal and vertical deflection drive circuits 7 and 8. Each circuit includes therein an oscillator responsive to the repetition rate of their respective sync signals and a sawtooth generator for developing a sawtooth shaped sweep wave at said repetition rate. The output of the vertical deflection circuit 8 in the form of an appropriate sweep voltage is in turn applied to control the vertical deflection output 9 through means of high frequency or coupling transformer 10. The sweep voltage output of vertical deflection output 9 is coupled through coupling transformer 11 to the vertical deflection coils 12 of an electromagnetic deflection system associated with image reproducer 4. It will be understood that terminal 3 is in communication with an appropriate terminal of the image reproducer 4, such as the control grid thereof (not illustrated).

The sawtooth shaped output of the horizontal deflection circuit 7 is inductively coupled through high frequency or coupling transformer 13 to the horizontal deflection output circuit 14 including therein an electron discharge device 15 having at least a cathode 16, a control grid 17, a screen grid 18 and an anode 19 to amplify the sawtooth shaped current wave applied thereto. The amplified sawtooth wave output at anode 19 is conducted to the primary winding 23 of autotransformer 21 with sufficient power to appropriately excite the horizontal deflection winding 20 through means of the inductance coil 22 serially connected to winding 20 and inductively coupled to primary winding 23. The autotransformer 21 includes primary winding 23, directly coupled between anode 19 and screen grid 18 and inductively coupled to the inductance coil 22, and a secondary winding 24 connected between the anode 19 and a high voltage alternating current rectifying means 25.

The operation of circuit 14, the driver for my power supply system, is as follows. A sawtooth wave coupled through transformer 13 to control grid 17 causes electron discharge device 15 to conduct during the rising portion thereof which passes a current through the primary winding 23. The passage of current through winding 23 develops an electromagnetic field or flux which is inductively coupled to induction coil 22, causing a current to flow in the serially connected deflection winding 20 which in turn develops a magnetic field to cause the electron beam generated within image reproducer 4 to be swept in a known manner. During the retrace portion of the sawtooth wave the electron discharge device 15 is cut-off rather suddenly stopping the flow of current through primary winding 23 resulting in a collapse of the magnetic field in the horizontal deflection system which through a known inductive chain reaction induces an extremely large magnitude voltage pulse in the secondary winding 24 of autotransformer 21, said voltage pulse occurring therein at a repetitious rate equal to the repetitious rate of the sawtooth wave. These voltage pulses are coupled to high voltage rectifier 25 for substantial removal of the alternating component of the repetitious pulses and delivers a high unidirectional voltage for application to the anode terminal 26 of image reproducer 4.

Associated with this pulse step-up type power supply is a conductor 27 including condenser 28 which is directly connected to the circuit of induction coil 22 and deflection winding 20 for removal of the voltage pulse initiating the appearance of the voltage pulse in winding 24 during the period of magnetic collapse. Condenser 28 provides a means of coupling the pulsed voltage in the horizontal deflection system to the rectifying means 29, a diode rectifier or a selenium rectifier appropriately connected, and a filter arrangement 30 including a resistor 31 and a condenser 32 for substantial elimination of the alternating component of the voltage pulses induced during the period of magnetic flux collapse. In this manner it is possible to utilize the induced voltage pulse in the deflection system itself during magnetic flux collapse to provide a low unidirectional potential at terminal 33 of sufficient magnitude to supply the necessary B+ or anode voltage for the remaining circuit components in a television receiving system including all the electron discharge devices included in the television block 1, sync separator 6, and the vertical and horizontal deflection drive circuits 7 and 8. The amount of low potential and the amount of high potential delivered by the power supply system of this invention depends upon the amount of power delivered from electron discharge device 15 and may thus be made as large or as small as desired within the power handling limits of the electron discharge device 15 by selecting an appropriate operating condition and magnitude of voltage output from circuit 7.

In the above description it has been assumed that the circuit has been in operation. To start the operation of my power supply system and establish the operating condition for the horizontal deflection output circuit 14, the following is necessary. D. C. potential for the various electrodes included in device 15 must be provided for appropriate response to the output of circuit 7 and the circuitry associated with device 15 must cause an oscillation therein to initially develop the low unidirectional voltage at terminal 33 for proper functioning of the circuitry necessary to produce the sawtooth wave applied to grid 17. The necessary D. C. potential is derived directly from the power line voltage, 110 volts A. C., 60 cycles applied at terminals 34 and 35 by means of rectifier 36, a diode or selenium type rectifier, and the filter arrangement 37 associated therewith including resistor 38 and capacitors 39. Filter 37 is provided with two output leads. One lead, considered to be the reference potential point, is connected to point 40 to place one terminal of the secondary winding of transformer 13 and the cathode circuit, including bias resistor 41, at the reference potential. The other lead carrying the positive D. C. voltage is connected to screen grid 18. Such an arrangement places the desired D. C. potentials upon the electrode of device 15 and enables the desired conduction characteristic under the influence of the sawtooth wave applied upon grid 17.

The primary winding 23 of autotransformer 21 is coupled to the positive side of the electrode voltage source and screen grid 18, through means of damping device 42 which is included therein to substantially eliminate the possibility of establishing an oscillation within the deflection system of image reproducer 4 and the autotransformer 21 upon the collapse of the magnetic flux.

However, before the sawtooth wave can be produced and applied to grid 17, some provision must be made to initially generate a low unidirection voltage at terminal 33 for operation of the remaining stages of the television receiving system. This is accomplished by incorporating appropriate circuit connections in circuit 14 to cause device 15 to function as a low level oscillator for activation of the horizontal deflection circuit until such time that the sawtooth waves arrive at grid 17. Once the sawtooth waves are present the device 15 will primarily function to amplify the signals coupled thereto and will substantially discontinue the oscillations required thereof to start the operation of my television receiver.

The initial low level oscillations are accomplished by providing a small amount of feedback between the anode circuit and the grid circuit, or the cathode circuit and the grid circuit. Fig. 1 illustrates one form of feedback which will provide the desired oscillations immediately after the television equipment is turned on and amplification upon application of the sawtooth wave to grid 17. The small amount of feedback required is provided by coupling condenser 43 coupled between anode 19 and grid 17.

Fig. 3 illustrates an alternative feedback arrangement which may be incorporated in circuit 14 in place of the condenser 43 of Fig. 1. A coil 44 is connected in the cathode circuit of device 15 as shown and physically positioned adjacent the secondary of transformer 13 in a manner to provide mutual coupling therebetween. The spacing therebetween may be adjusted to provide the necessary feedback to cooperate in initiating the operation of the power supply system of this invention.

Fig. 2 illustrates still another alternate feedback arrangement to be incorporated in the circuit 14 to produce the oscillatory energy necessary to produce the initial amount of low unidirectional B+ at terminal 33. This feedback circuit consists essentially of physically positioning primary coil 23 of the autotransformer 21 adjacent the secondary of transformer 13 to provide a mutual coupling therebetween of sufficient magnitude to initiate the operation of my power supply.

In certain circuits of television systems and the like, two values of low unidirectional voltage are required. The employment of my power supply system enables two ways of achieving these low voltages. One way employs a conductor 45 which couples from the primary coil 23 the voltage pulse of secondary winding 24 and the voltage pulse of the deflection system to rectifier system 46 to derive a unipotential voltage intermediate the high unidirectional potential and the low unidirectional potential. This intermediate voltage is applied to certain components of vertical deflection output 9 requiring this intermediate value of voltage. The second way of developing the intermediate voltage is to remove conductor 45, operate device 15 for high power output to obtain the desired intermediate voltage at terminal 33, in the manner outlined above, and employ an appropriate voltage divider to obtain the desired low unidirectional voltage.

Close examination of the circuit connections employed in the power supply of this invention will disclose that that portion of the circuitry enclosed in box or unit 47 including the power line voltage inputs at terminals 34 and 35, are electrically isolated from the chassis ground connection of the other components incorporated in a typical television receiver. This electrical isolation is provided by transformers 13, 10, 11 and the inductive coupling between the primary winding 23 and the induction coil 22. To assure the elimination of any shock hazard on the chassis of the electronic equipment it would be necessary to provide a high voltage return from cathode 48 of image reproducer 4 to terminal 34 of the power line voltage input and from the deflection output 9 and terminal 34 as indicated by conductors 49 and 50, when this type of intermediate voltage production is employed.

To physically provide the isolation feature presented by employing my power supply system the main equipment should be insulated from a sub-chassis having mounted thereon all the components enclosed by the dotted box 47 by means of a dielectric mounting device or dielectric layer interposed between said main chassis and said sub-chassis when combined in apparatus pertinent to the subject matter of this invention. Employing the second type of intermediate voltage derivation would enable a reduction in the size of the isolated unit 47 by removing output circuit 9 and rectifier system 46 therefrom.

While I have described above the principles of my invention in connection with specific apparatus, it is to be clearly understood that this description is made only by way of example and not as a limitation to the scope of my invention as set forth in the objects thereof and in the accompanying claims.

I claim:

1. A unidirectional voltage supply system for apparatus having a cathode ray device and in which both high and low unidirectional voltages are required, comprising a deflection system for the cathode ray device, a source of sawtooth shaped waves, a circuit including an electron discharge device to impress the waves of said source upon said deflection system, a source of power line voltage, means responsive to said source of power line voltage to supply a potential for establishing a predetermined operating condition for said electron discharge device, means coupled to said circuit to develop said high unidirectional voltage during the retrace portion of said sawtooth waves, and means coupled to said deflection system to develop said low unidirectional voltage during said retrace portion.

2. A unidirectional supply system for apparatus having a cathode ray device and in which both high and low unidirectional voltages are required, comprising a deflection system for the cathode ray device, a source of sawtooth shaped waves, a circuit including an electron discharge device to impress the waves of said source upon said deflection system, a source of power line voltage, means responsive to said source of power line voltage to supply a potential for establishing a predetermined operating condition for said electron discharge device, means coupled to said circuit to develop said high unidirectional voltage during the retrace portion of said sawtooth waves, and means coupled to said deflection system to develop said low unidirectional voltage during said retrace portion, said source of sawtooth waves comprising a source of television signals including horizontal synchronizing pulses, means to separate said horizontal synchronizing pulses from said television signals, generating means coupled to said circuit for producing sawtooth shaped waves having a rapid retrace portion repetitious at the rate of said horizontal synchronizing pulses and inductive means to couple said sawtooth shaped waves to said circuit, said inductive means comprising a high frequency transformer having primary and secondary windings and said circuit includes an electron discharge device having at least a cathode, an anode, a control grid electrode, and a screen grid electrode, the primary winding of said transformer being coupled to the output of said generating means and the secondary winding of said transformer being coupled between the control grid and the cathode of said electron discharge device, said responsive means comprising an alternating voltage rectifier device and a filter network coupled thereto for production of operating potentials for said electron discharge device from the alternating voltage of said power line source, and means coupling the operating potentials to said cathode and said screen electrode to cause said discharge device to be conductive only during the rising portion of said sawtooth wave.

3. A system according to claim 2 wherein said filter network includes a pair of output connections, one of said connections maintained at a reference potential for connection to said cathode and the other of said connections maintained at an elevated potential with respect to said reference potential for connection to said screen electrode.

4. A system according to claim 3, wherein said circuit includes a cathode resistor coupled to said cathode at one end thereof and means to couple the other end of said resistor to one terminal of said secondary winding, said one of said connections connected to said means coupling the operating potentials for cooperation in providing the desired operating conditions for said discharge device.

5. A unidirectional voltage supply system for apparatus having a cathode ray device and in which both high and low unidirectional voltages are required, comprising a deflection system for the cathode ray device, a source of sawtooth shaped waves, a circuit including an electron discharge device to impress the waves of said source upon said deflection system, a source of power line voltage, means responsive to said source of power line voltage to supply a potential for establishing a predetermined operating condition for said electron discharge device, means coupled to said circuit to develop said high unidirectional voltage during the retrace portion of said sawtooth waves, and means coupled to said deflection system to develop said low unidirectional voltage during said retrace portion, said source of sawtooth waves comprising a source of television signals including horizontal synchronizing pulses, means to separate said horizontal synchronizing pulses from said television signals, generating means coupled to said circuit for producing sawtooth shaped waves having a rapid retrace portion repetitious at the rate of said horizontal synchronizing pulses and inductive means to couple said sawtooth shaped waves to said circuit, said inductive means comprising a high frequency transformer having primary and secondary windings and said circuit includes an electron discharge device having at least a cathode, an anode, a control grid electrode, and a screen grid electrode, the primary winding of said transformer being coupled to the output of said generating means and the secondary winding of said transformer being coupled between the control grid and the cathode of said electron discharge device, said circuit further including an autotransformer having primary and secondary windings, means to simultaneously couple one end of the primary winding and one end of the secondary winding of said autotransformer to said anode, and means to couple the other end of the primary winding of said autotransformer to said screen electrode providing an interaction between the windings of said autotransformer to develop large voltage pulses in said secondary winding during the retrace portions of said sawtooth wave.

6. A system according to claim 5, wherein said means coupled to said circuit includes an alternating voltage rectifier coupled to said other end of the primary winding of said autotransformer to develop a unidirectional voltage intermediate said high unidirectional voltage and said low unidirectional voltage.

7. A system according to claim 5, wherein said means to couple the other end of the primary winding of said autotransformer to said screen electrode includes a damping device to reduce the effects of oscillations in said autotransformer during the retrace portion of said sawtooth wave.

8. A system according to claim 5, wherein said deflection system includes a horizontal deflection winding and an inductance coil inductively coupled to the primary winding of said autotransformer and serially connected to said horizontal deflection winding, said deflection system experiencing voltage pulses of reduced amplitude to induce the large voltage pulses in the secondary windings of said autotransformer during the retrace portion of said sawtooth wave.

9. A system according to claim 8, wherein said means coupled to said deflection system comprises an alternating voltage rectifier system connected to the circuit of said deflection winding and said inductance coil to develop said low unidirectional voltage from the induced voltage pulses of said deflection system.

10. A system according to claim 1, wherein said circuit includes an electron discharge device having at least a cathode, an anode, a control grid electrode and a screen grid electrode, a cathode resistor coupled to said cathode at one end thereof, an autotransformer having primary and secondary windings, means to simultaneously couple one end of said primary winding and one end of said secondary winding to said anode, means to couple the other end of said primary winding to said screen electrode, a secondary winding of a coupling transformer for coupling said sawtooth wave to said electron discharge device, one terminal of the secondary winding of said coupling transformer coupled to said grid, and means to couple the other end of said resistor to the other terminal of the secondary winding of said coupling transformer.

11. A system according to claim 5, wherein said deflection system includes an alternating voltage rectifier device and a filter network coupled thereto for production of operating potentials for said electron discharge device.

12. A system according to claim 1, wherein said means coupled to said circuit comprises an alternating voltage rectifier and an autotransformer coupled to the output of said circuit, said voltage rectifier coupled to the secondary of said autotransformer to develop said high unidirectional voltage from the large voltage of pulses induced in the secondary winding of said autotransformer by the collapse of magnetic flux in said deflection system during the retrace portion of said sawtooth wave.

13. A system according to claim 1, wherein said means coupled to said deflection system comprises an autotransformer, a horizontal deflection winding, an inductance coil inductively coupled to the primary winding of said autotransformer and serially connected to said horizontal deflection winding, and an alternating voltage rectifier system connected to the circuit of said deflection winding and said inductance coil to develop said low unidirectional voltage from the induced voltage pulses of said deflection system.

14. A unidirectional voltage power supply system for apparatus having a cathode ray device and in which both high and low unidirectional voltages are required, comprising the horizontal electromagnetic deflection system for said cathode ray device including a deflection winding and an inductance coil serially connected, means for generating a repetitious sawtooth wave, means including an electron discharge device for amplifying said sawtooth wave, an autotransformer having primary and second windings, said primary winding being coupled to the output of said electron discharge device and being inductively coupled to the inductance coil of said deflection system, a source of power line voltage, a first alternating voltage rectifying means coupled to said source to develop operating potentials for said electron discharge device from the power line voltage to establish a predetermined conduction characteristic therefor, a second alternating voltage rectifying means coupled to the secondary winding of said autotransformer for developing said high unidirectional voltage from the energy derived from said secondary winding during the retrace portion of said sawtooth wave, and a third alternating voltage rectifying means coupled to the circuit of the deflection winding and the inductance coil of said deflection system for developing said low unidirectional voltage from the energy derived from said deflection system during said retrace portion.

15. A unidirectional voltage supply system for apparatus having a cathode ray device and in which both high and low unidirectional voltages are required comprising a first chassis functioning as a reference potential bus bar for components mounted thereon, the horizontal electromagnetic deflection system for said cathode ray device mounted on said first chassis, means for generating a repetitious sawtooth wave having inductive output means mounted on said first chassis, a second chassis functioning as a reference potential bus bar for components mounted thereon, means including an electron discharge device having inductive input means for amplifying said sawtooth wave mounted on said second chassis, an autotransformer having primary and secondary windings mounted on said second chassis, said primary winding being coupled to the output of said electron discharge device and being inductively coupled to said deflection system, a source of power line voltage, a first alternating voltage rectifying means mounted on said second chassis coupled to said source to develop operating potentials for said electron discharge device from the power line voltage to establish a predetermined operating condition therefor, a second alternating voltage rectifying means mounted on said second chassis coupled to the secondary winding of said autotransformer for developing said high unidirectional voltage from the energy derived from said secondary winding during the retrace portion of said sawtooth wave, a third alternating voltage rectifying means mounted on said first chassis coupled to the circuit of said deflection system for developing said low unidirectional voltage from the energy derived from said deflection system during said retrace portion, and means electrically isolating said first chassis from said second chassis to eliminate the shock hazard of the voltage of said source including a dielectric insulation disposed physically between said first and second chassis, said inductive input means, said inductive output means, and the inductive cooperation between said autotransformer and said deflection system.

16. A unidirectional voltage supply system for apparatus having a cathode ray device and in which both high and low unidirectional voltages are required, comprising a deflection system for the cathode ray device, a source of sawtooth shaped waves, a circuit including an electron discharge device to impress the waves of said source upon said deflection system, a source of power line voltage, means responsive to said source of power line voltage to supply a potential for establishing a predetermined operating condition for said electron discharge device, means coupled to said circuit to develop said high unidirectional voltage during the retrace portion of said sawtooth waves, means coupled to said deflection system to develop said low unidirectional voltage during said retrace portion, means to conduct said low unidirectional voltage to other components of said apparatus including said source of sawtooth shaped waves and feedback means included in said circuit to produce low level oscillations therein to initially produce said low unidirectional voltage until the waves of said source are impressed upon said deflection system.

17. A system according to claim 16, wherein said electron discharge device includes at least a cathode, an anode, a control grid electrode and a screen grid electrode and said feedback means includes a condenser connected between said anode and said control grid.

18. A system according to claim 16, wherein said circuit includes an electron discharge device having at least a cathode, an anode, a control grid electrode, and a screen grid electrode and inductive means in the grid circuit of said device in coupling relation to said source, and said feedback means includes an inductive coil in the cathode circuit of said device positioned in coupling relation to said inductive means.

19. A system according to claim 16, wherein said circuit includes an electron discharge device having at least a cathode, an anode, a control grid electrode and a screen grid electrode, an autotransformer having primary and secondary windings, means to simultaneously couple one end of the primary winding and one end of the secondary winding of said autotransformer to said anode, means to couple the other end of the primary winding of said autotransformer to said screen grid electrode, means coupled to said circuit to develop said high unidirectional voltage connected to the other end of the secondary winding of said autotransformer and inductive means in the grid circuit of said device in coupling relation to said source, and said feedback means includes the positioning of the primary of said autotransformer adjacent said inductive means for mutual coupling therebetween.

References Cited in the file of this patent
UNITED STATES PATENTS

| | | |
|---|---|---|
| 2,302,876 | Malling | Nov. 24, 1942 |
| 2,482,150 | Bocciarelli | Sept. 20, 1949 |
| 2,577,112 | Duke | Dec. 4, 1951 |
| 2,579,627 | Tourshou | Dec. 25, 1951 |
| 2,588,652 | Nelson | Mar. 11, 1952 |
| 2,588,659 | Pond | Mar. 11, 1952 |
| 2,606,306 | Bridges | Aug. 5, 1952 |
| 2,637,832 | Rogers | May 5, 1953 |
| 2,644,105 | Fyler | June 30, 1953 |
| 2,686,276 | Anderson | Aug. 10, 1954 |
| 2,697,798 | Schlesinger | Dec. 21, 1954 |